3,424,757
Patented Jan. 28, 1969

3,424,757
**2,3(AND 1,3)-DI-($R_4$-$R_5$-HYDROXYMETHYL)-6-
$R_1$-6-$R_2$-FULVENES**
Richard Joseph Mohrbacher, Fort Washington, Joseph Albert Meschino, North Wales, and Chris Royce Rasmussen, Ambler, Pa., assignors to McNeil Laboratories, Inc., a corporation of Pennsylvania
No Drawing. Filed June 21, 1966, Ser. No. 559,112
U.S. Cl. 260—296        4 Claims
Int. Cl. C09d 5/32; C07c 35/22

ABSTRACT OF THE DISCLOSURE

The compounds are of the class of poly-substituted fulvenes which are useful as ultraviolet absorbers.

---

This invention relates to novel organic compounds and, more particularly, to poly-substituted fulvenes represented by the following formulas:

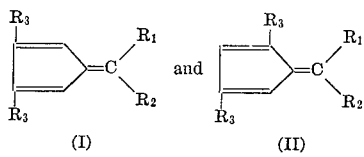

wherein $R_1$ and $R_2$ are each a member selected from the group consisting of hydrogen, aryl, preferably phenyl, substituted aryl such as, for example, halophenyl, nitrophenyl and the like, heteroaryl and substituted heteroaryl such as, for example, pyridyl, quinolyl, thienyl, alkylpyridyl and the like, provided that at least one of said $R_1$ and $R_2$ is other than hydrogen. The preferred heteroaryl is 2-pyridyl. Both of $R_3$ in (I) and (II) are the same and equal to an $R_4R_5C(OH)$— group in which $R_4$ and $R_5$ have the same definition and limitation as previously described for $R_1$ and $R_2$, respectively. The compounds of Formula I may be denoted as 2,3-di-($R_4$-$R_5$-hydroxymethyl)-6-$R_1$-6-$R_2$-fulvenes; and of Formula II as 1,3-di-($R_4$-$R_5$-hydroxymethyl)-6-$R_1$-6-$R_2$-fulvenes.

The subject poly-substituted fulvenes absorb ultraviolet (U.V.) light and can be employed as effective U.V. screens when incorporated in plastics and suitable vehicles such as transparent film-forming compositions and oils. Furthermore, they are useful in chemical synthesis: for example, in the preparation of Diels-Alder adducts with maleimide as described in former copending application Ser. No. 559,109, subsequently abandoned in favor of continuation-in-part application Ser. No. 635,369.

Those compounds wherein $R_1$ and $R_2$ in the 6-position of the fulvene are the same as $R_4$ and $R_5$, respectively, in each $R_3$ substituent may be prepared by the interaction of an excess of an appropriate compound of the formula $R_1$—CO—$R_2$ with a cyclopentadienyl alkali metal, e.g., cyclopentadienyl sodium at reduced temperatures (about −20° C. to 20° C.) in the presence of a base such as, for example, an alkali metal lower alkoxide, in a lower alkanol solvent. The preferred alkoxide and lower alkanol are sodium ethoxide and ethanol, respectively. It has generally been found that best yields of product are obtained after a reaction time of at least 3 hours. Among the preferred compounds obtained according to this procedure are 1,3-bis(α-hydroxybenzyl)-6-phenyl-fulvene and 2,3-bis(di-2-pyridylhydroxymethyl)-6,6-di-2-pyridyl-fulvene.

Those compounds wherein $R_1$ and $R_2$ in the 6-position of the fulvene differ from $R_4$ and $R_5$, respectively, in the $R_3$ substituent may be prepared by the interaction, under similar conditions as those described above, of an excess of an appropriate compound of the formula $R_1$—CO—$R_2$ with cyclopentadiene that has been presubstituted with an appropriate $R_4R_5C(OH)$— group, the $R_4$ and $R_5$ of the latter cyclopentadienyl $R_4$—$R_5$— methanol reactant being different from the $R_1$ and $R_2$ of the $R_1$—CO—$R_2$ reactant. For example, the interaction of di-2-pyridyl ketone with diphenylhydroxymethyl-cyclopentadiene yields another of the preferred compounds: 2,3-bis(di-2-pyridylhydroxymethyl)-6,6-diphenyl-fulvene.

If in the procedure immediately preceding, the $R_1$ and $R_2$ of the $R_1$—CO—$R_2$ reactant are equal to the $R_4$ and $R_5$, respectively, of the cyclopentadienyl $R_4$—$R_5$— methanol reactant, an alternative method is thereby provided for the preparation of those compounds wherein $R_1$ and $R_2$ in the 6-position of the fulvene are the same as $R_4$ and $R_5$, respectively, in each $R_3$ substituent.

The cyclopentadienyl $R_4$—$R_5$— methanol reactant may be prepared by the interaction of a cyclopentadienyl Grignard reagent, e.g., a cyclopentadienyl magnesium halide such as cyclopentadienyl magnesium bromide, with an appropriate $R_4$—CO—$R_5$ compound in a nonhydroxylic solvent, preferably at reduced temperatures.

It has been found that, depending upon the particular reactants employed in the foregoing methods of preparation, the location of the two $R_3$ substituents in the resulting fulvene will be predominantly in either the 2,3-position as in Formula I or in the 1,3-position as in Formula II, although, in all likelihood, a small amount of the other respective form is also obtained in each case. For example, the interaction of cyclopentadienyl sodium with the $R_1$—CO—$R_2$ reactant, di-2-pyridyl ketone, results in a fulvene product favoring 2,3-substitution, i.e., 2,3-bis(di-2-pyridylhydroxymethyl)-6,6-di-2-pyridyl-fulvene; whereas the interaction of cyclopentadienyl sodium with the $R_1$—CO—$R_2$ reactant, benzaldehyde, results in a fulvene product favoring 1,3-substitution, i.e., 1,3-bis(α-hydroxybenzyl)-6-phenyl-fulvene.

The following examples are intended to illustrate, but not to limit, the scope of the present invention.

EXAMPLE I

To a solution of 6.9 g. (0.3 g.-atom) of sodium dissolved in 150 ml. of absolute ethanol is added 21 g. (0.32 mole) of freshly distilled cyclopentadiene. This solution, under nitrogen, is added dropwise over 30 min. to a solution of 63.6 g. (0.60 mole) of benzaldehyde in 450 ml. of absolute ethanol at 0–3° C. with stirring. After stirring 3 hrs. at 3° C., the mixture is filtered to give about 11.9 g. of orange crystals. Two recrystallizations from benzene yields crystalline 1,3-bis(α-hydroxybenzyl)-6-phenyl-fulvene; M.P. 180–182°C.

$\lambda_{max.}^{KBr}$ 2.98, 6.18μ; $\lambda_{max.}^{CH_3OH}$ 316 mμ (ε 25,200)

Analysis.—Calcd. for $C_{26}H_{22}O_2$: C, 85.21; H, 6.05%.
Found: C, 85.18; H, 5.79%.

The NMR spectrum (DMF–$d_7$) exhibits the following peaks: singlets at 5.60, 5.88, 6.30, 6.55δ (four vinyl and methine protons) and a series of multiplets from 7.0 to 7.62δ (fifteen phenyl and one vinyl protons).

EXAMPLE II

To a solution of 10 g. (0.05 mole) of di-2-pyridyl ketone and 0.7 g. (0.03 mole) of sodium in 50 ml. of absolute ethanol, all at −5° C. to −10° C., is added over a 15 minute period 2 g. (0.03 mole) of cyclopentadiene. Stirring at this temperature is continued for a period of about 5 hours after which 3.2 g. (0.05 mole) of acetic acid is added. After standing at room temperature for several hours, the resulting precipitate is collected by filtration. Purification is effected by boiling the product in ethyl acetate, it being insoluble in this solvent. The product, 2,3-bis(di - 2-pyridylhydroxymethyl)-6,6-di-2-pyridyl-fulvene, melts with decomposition at about 225° C.

Analysis.—Calcd. for $C_{33}H_{26}O_2$: N, 13.99%. Found: N, 13.93%.

EXAMPLE III

To an ethereal solution of ethyl magnesium bromide prepared from 4.86 g. (0.2 g.-atom) of magnesium and 25 g. (0.229 mole) of ethyl bromide is added 125 ml. of dry benzene. Ether is distilled until the boiling point of the mixture reaches 60–63° C. Then 13.2 g. (0.2 mole) of freshly distilled cyclopentadiene is added and the mixture is refluxed for six hours. The resultant cyclopentadienyl magnesium bromide solution is cooled under an atmosphere of dry nitrogen to below 0° C. and 36.4 g. (0.2 mole) of benzophenone in 100 ml. of ether is added with stirring. After stirring for an additional 30 min., the mixture is hydrolyzed with excess ice water containing 12.0 g. (0.2 mole) of glacial acetic acid. The organic phase is separated and the aqueous phase extracted with three 150–200 ml. portions of ether. The combined extracts are washed with dilute sodium bicarbonate solution and dried over sodium sulfate. Most of the solvent is evaporated in vacuo and the resultant semicrystalline mass crystallizes upon addition of hexane. The solid is filtered, washed with pet ether, and dried to yield α-cyclopentadienyl-α-phenylbenzyl alcohol; M.P. 119–123° C.

EXAMPLE IV

Di-2-pyridyl ketone, 73.2 g. (0.4 mole) is dissolved in 300 ml. of absolute ethanol and then cooled to −12° C. in an ice-salt bath. Twenty mls. of ethanol containing 0.23 g. (0.01 g.-atom) of dissolved sodium is then added and a solution of 23.8 g. (0.1 mole) of α-cyclopentadienyl-α-phenyl-benzyl alcohol in 200 ml. of absolute ethanol is added over a 1.5 hrs. period. Stirring is continued overnight, the temperature not exceeding 9° C. The resulting solid is removed by filtration and dried; M.P. 232–244° C. dec. Two recrystallizations from chloroform-methanol-ethanol gives 2,3-bis(di-2-pyridylhydroxymethyl)-6,6-diphenyl-fulvene; M.P. 252–254° C., sl. dec.

$\lambda_{max.}^{MeOH}$ 252 shl. ($\epsilon$ 23,500), 255 ($\epsilon$ 24,000), 260 shl. ($\epsilon$ 23,200) and 341 m$\mu$ ($\epsilon$ 28,000)

*Analysis.*—Calcd. for $C_{40}H_{30}N_4O_2$ (598.67): C, 80.24; H, 5.05; N, 9.36%. Found: C, 80.50, 80.13; H, 5.25, 5.24; N, 9.54, 9.09%.

What is claimed is:

1. 1,3-bis(α-hydroxybenzyl)-6-phenyl-fulvene.
2. A compound having the formula:

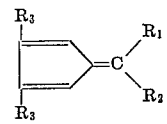

wherein $R_1$ and $R_2$ are the same member selected from the group consisting of phenyl and 2-pyridyl; and $R_3$ is di-2-pyridylhydroxymethyl.

3. The compound of claim 2 which is 2,3-bis(di-2-pyridylhydroxymethyl)-6,6-diphenyl-fulvene.
4. The compound of claim 2 which is 2,3-bis(di-2-pyridylhydroxymethyl)-6,6-di-2-pyridyl-fulvene.

References Cited

UNITED STATES PATENTS 3,376,304    4/1968    Mohrbacher et al. ____ 260—288

FOREIGN PATENTS 660,853    9/1965    Belgium.

HENRY R. JILES, *Primary Examiner.*

A. L. ROTMAN, *Assistant Examiner.*

U.S. Cl. X.R.

260—45.8, 618, 240

UNITED STATES PATENT OFFICE
CERTIFICATE OF CORRECTION

Patent No. 3,424,757                                                       January 28, 1969

Richard Joseph Mohrbacher et al.

It is certified that error appears in the above identified patent and that said Letters Patent are hereby corrected as shown below:

Column 2, line 71, the formula "$C_{33}H_{28}O_2$" should read -- $C_{38}H_{28}N_6O_2$ --.
Column 4, line 3, the formula "$C_{40}H_{30}N_{40}O_2$" should read -- $C_{40}H_{30}N_4O_2$ --.

Signed and sealed this 17th day of March 1970.

(SEAL)
Attest:

Edward M. Fletcher, Jr.                                    WILLIAM E. SCHUYLER, JR.
Attesting Officer                                               Commissioner of Patents